US008806088B2

(12) United States Patent
Weiser et al.

(10) Patent No.: US 8,806,088 B2
(45) Date of Patent: *Aug. 12, 2014

(54) PROGRAMMING TARGET DEVICES VIA TRACES THAT TRAVERSE A STRUCTURALLY COMPROMISED REGION OF A PRINTED CIRCUIT BOARD (PCB)

(71) Applicant: Marvell World Trade Ltd., St. Michael (BB)

(72) Inventors: William B. Weiser, Meridian, ID (US); Thomas G. Warner, Boise, ID (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,229

(22) Filed: Oct. 10, 2013

(65) Prior Publication Data
US 2014/0040513 A1 Feb. 6, 2014

Related U.S. Application Data

(63) Continuation of application No. 13/280,053, filed on Oct. 24, 2011, now Pat. No. 8,615,616.

(60) Provisional application No. 61/407,683, filed on Oct. 28, 2010.

(51) Int. Cl.
*G06F 13/38* (2006.01)

(52) U.S. Cl.
USPC ........ 710/38; 710/8; 710/9; 710/10; 710/316; 361/748; 361/803

(58) Field of Classification Search
USPC ................... 710/8–10, 38, 316; 361/748, 803
See application file for complete search history.

(56) References Cited

U.S. PATENT DOCUMENTS

| 7,143,509 | B2 * | 12/2006 | Lee ................................. 29/852 |
| 8,222,537 | B2 | 7/2012 | Dudnikov, Jr. et al. |
| 8,310,835 | B2 | 11/2012 | Lin et al. |
| 8,339,804 | B2 | 12/2012 | Crabtree et al. |
| 8,615,616 | B2 | 12/2013 | Weiser et al. |

OTHER PUBLICATIONS

"Restriction Requirement", U.S. Appl. No. 13/280,053, Mar. 19, 2013, 4 Pages.
"Notice of Allowance", U.S. Appl. No. 13/280,053, Jul. 9, 2013, 9 pages.

* cited by examiner

*Primary Examiner* — Tammara Peyton

(57) ABSTRACT

The present disclosure describes techniques for scalable embedded memory programming. In some aspects data is received at a first communication interface from a host device, at least a portion of the data is stored to a memory device supported by a printed circuit board, and the data is transmitted to a target device via a second communication interface.

20 Claims, 7 Drawing Sheets

PROGRAMMING TARGET DEVICES VIA TRACES THAT TRAVERSE A STRUCTURALLY COMPROMISED REGION OF A PRINTED CIRCUIT BOARD (PCB)

RELATED APPLICATIONS

This application is a continuation of and claims priority to U.S. Utility patent application Ser. No. 13/280,053 filed Oct. 24, 2011 which claims priority to U.S. Provisional Patent Application Ser. No. 61/407,683 filed Oct. 28, 2010, the disclosure of which are incorporated by reference herein in their entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Computing and electronic devices often feature a modular architecture in which processing, memory, and communication components are pre-assembled as printed circuit assemblies (PCAs). Prior to assembly, non-volatile memory components of PCAs are typically programmed or flashed with code associated with the computing or electronic device for which the PCA is designed. These programmed memory components, however, once assembled into a PCA, may spend considerable time in the manufacturing process until deployed in a computing or electronic device. During this time, the code of the programmed memory component may need to be upgraded due to coding revisions or error corrections. To upgrade the memory components of the PCAs, an operator often connects each PCA to a programming host individually and waits while the memory component is re-programmed with the updated code. A re-programming process that is limited by host connectivity and/or availability consumes valuable time and resources, such as when each PCA is handled and re-programmed individually by an operator.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving, at a first communication interface, data from a host device via conductive traces of a circuit board that traverse a structurally compromised region of the circuit board, storing at least a portion of the data to a memory device supported by a section of the circuit board bounded on at least one edge by the structurally compromised region, and transmitting, via a second communication interface, the data to a target device via other conductive traces of the circuit board that traverse the structurally compromised region of the circuit board.

Another method is described configuring two or more target devices to store data received from a host device, components of the two or more target devices located on a printed circuit board (PCB) having a structurally compromised region that separates the components of each of the two or more target devices, and broadcasting, from a communication interface of the host device, data packets to the two or more target devices via conductive traces of the PCB that traverse the structurally compromised region of the PCB, the broadcast data packets stored by the two or more target devices to two or more respective memory components.

A System-on-Chip is described that is configured to receive, via a first communication interface, data from a programming host, store at least a portion of the data from the programming host in a memory, and transmit, via a second communication interface, at least the portion of the data to a programmable target device.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Conventional techniques for re-programming memory devices of printed circuit assemblies are typically time consuming and labor-intensive. This disclosure describes apparatuses and techniques for scalable embedded memory programming, which often permit memory devices of multiple circuit assemblies (e.g., PCBs) to be programmed or re-programmed more-quickly or with little or no extraneous handling. These memory devices can be programmed while the circuit assemblies are in panel form or in tray when in singulated form, thereby precluding the need to program and/or handle each circuit assembly individually.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
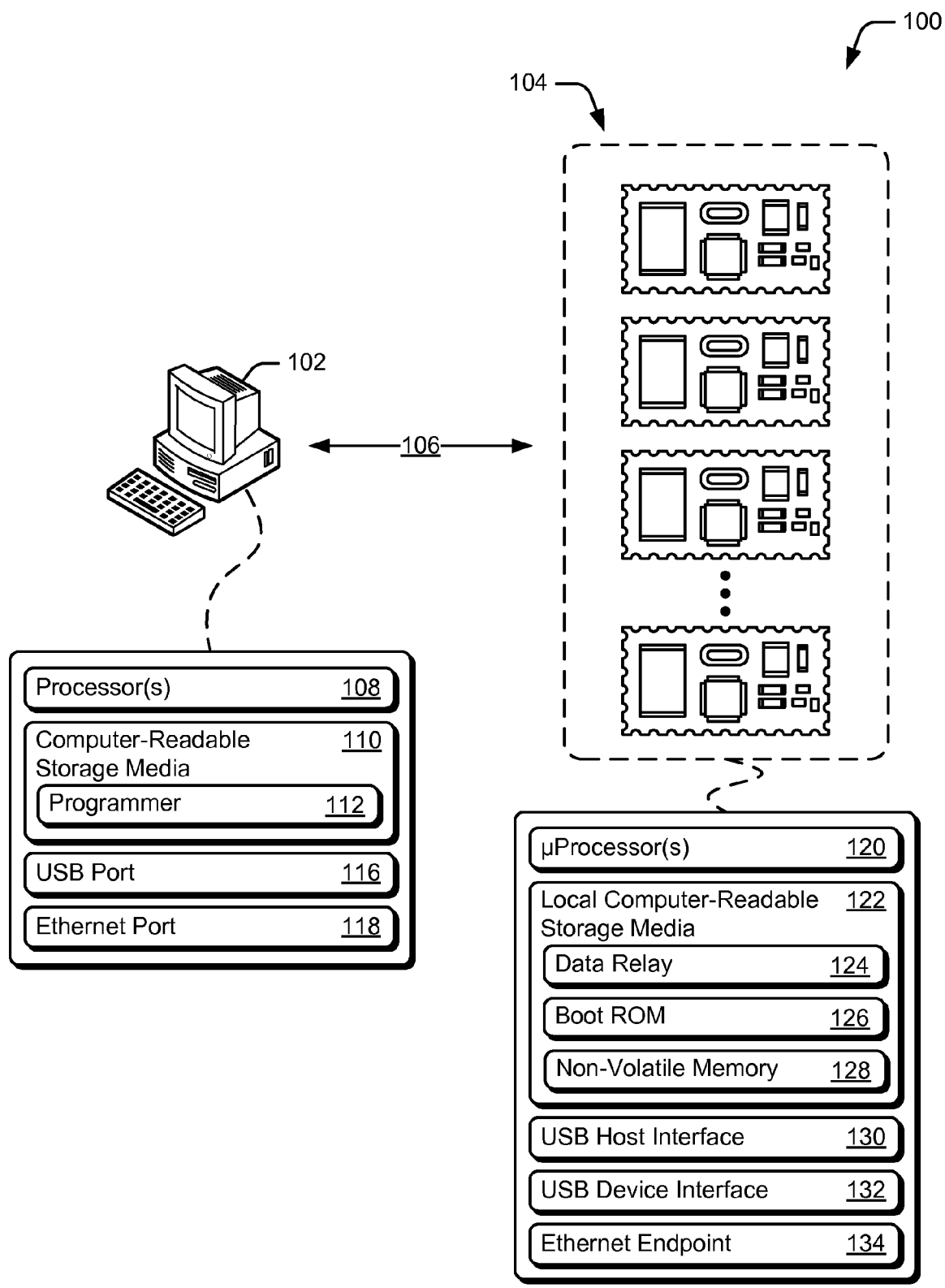
FIG. 1 illustrates an operating environment having printed circuit assemblies in accordance with one or more aspects.

FIG. 1 illustrates an example of an operating environment 100 having a programming host computing device 102 (programming host 102) and target printed circuit assemblies 104 (PCAs 104), each of which are capable of communicating data or packets over a programming medium 106, such as a universal serial bus (USB) cable or Ethernet cable. Although shown as a desktop computer, programming host 102 may include, by way of example and not limitation, a server, laptop computer, tablet computer, an embedded device, another PCA, and so on.

Programming host 102 includes processor(s) 108, computer-readable storage media 110 (CRM 110), and programmer 112, which, in one implementation, is embodied on CRM 110. CRM 110 may include any suitable memory or storage device such as random-access memory (RAM), read-only memory (ROM), or Flash memory useful to store data of applications and/or an operating system of the host device 102. Below is a description of how manager 122 is implemented and used.

Programming host 102 may also include USB port 116 and Ethernet port 118 providing an interface for communicating with other devices or peripherals such as target PCAs 104. Each communication interface is capable of communicating in accordance with a respective protocol or standard such as a USB specification (e.g. USB 2.0 or 3.0) or one of the IEEE 802.3 Ethernet standards. Although not shown, programming host 102 may include a custom or propriety programming port integrated via an internal interface such as a peripheral component interface express (PCI Express) slot or via an external interface adapter.

PCAs 104 include two or more similar or identically configured printed circuit assemblies designed for integration within a computing or electronic device. Computing or electronic devices in which a PCA 104 (e.g., a product PCA) may be embedded include printers, scanners, copiers, household appliances, kiosks, point-of-sale terminals, digital picture frames, set-top boxes, and so on. Each target PCA 104 is capable of providing processing and other functionalities for a computing or electronic device in which it is embedded. For example, a user interface, general purpose input/output (GPIO), motor controls, and communication capabilities of an ink jet printer may be provided by an embedded PCA 104.

Each target PCA 104 includes one or more microprocessor(s) 120 (μprocessor 120) and local computer-readable storage media 122 (local CRM 122), which may include any suitable memory or storage device. In the illustrated example, local CRM 122 includes boot ROM 126 and non-volatile memory 128 (NVM 128), which may include Flash (e.g., NAND or NOR), static RAM (SRAM), or other various types of programmable ROM (PROM). Although not shown, local CRM 122 may also include volatile memory such as RAM or dynamic RAM (DRAM), the contents of which is lost when un-powered. PCAs 104 also include data relay 124, which, in one implementation, is embodied on local CRM 122. Data relay 124 is capable of generating or modifying unique address information of a target PCA 104. This unique address information may enable a programming host 102 to address or communicate with individual target PCAs 104 (e.g., for status updates or selective programming). Data relay 124 may also be capable of enabling a target PCA 104 to transmit data to other target PCAs 104 (e.g., programming other target PCAs 104). Below are examples of these capabilities and other implementations of data relay 124.

PCAs 104 also include USB host interface 130 and USB device interface 132 each of which are capable of providing host or device USB communication services respectively. Alternately or additionally, PCAs 104 can include Ethernet endpoint 134 capable of communicating packets and frames over a suitable medium, such as programming medium 106.

Figure 2:
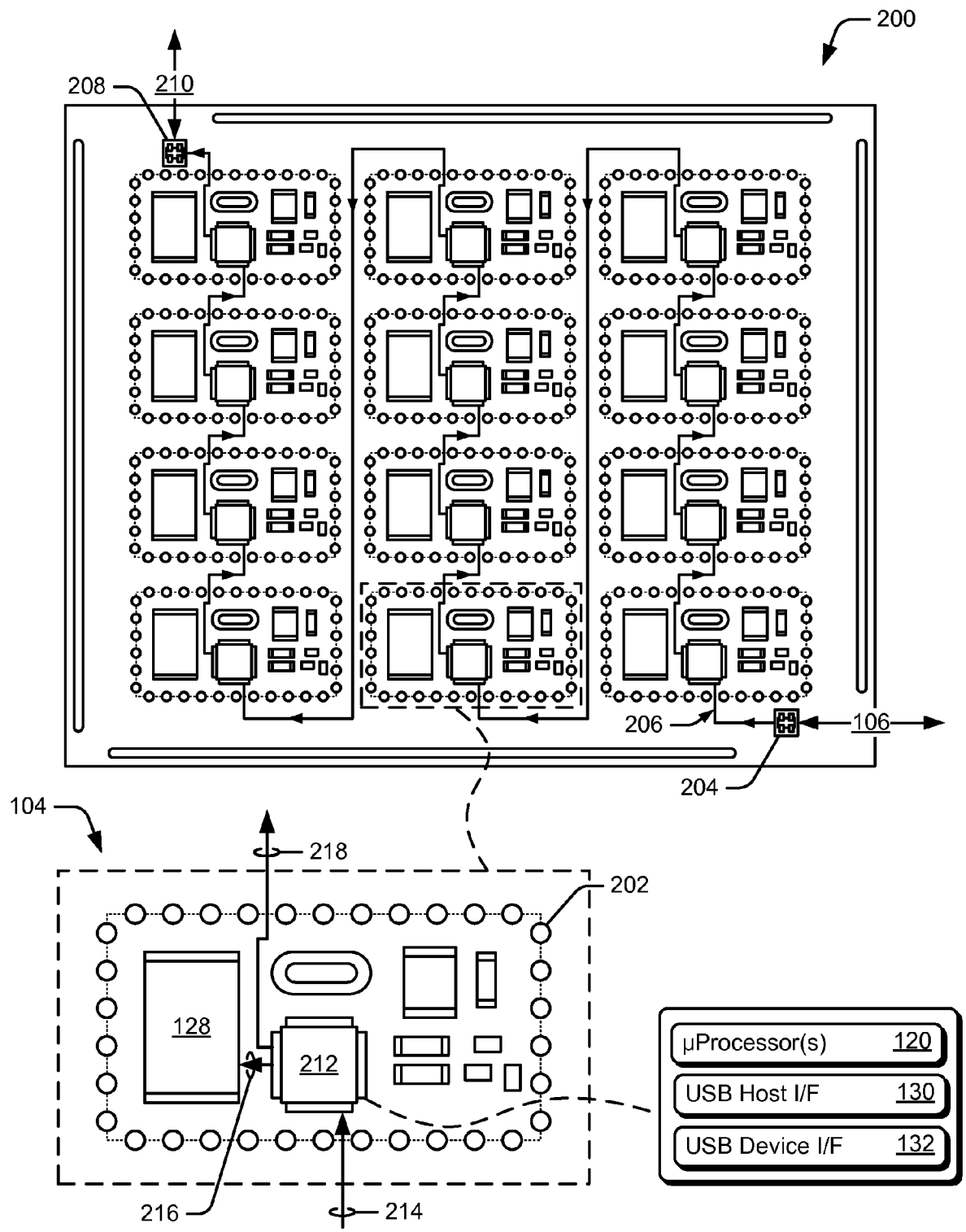
FIG. 2 illustrates an example of printed circuit assemblies of FIG. 1 panelized in accordance with one or more aspects.

FIG. 2 illustrates an example of an array of PCAs 104 of FIG. 1 panelized as printed circuit board (PCB) panel 200. Although shown as supporting 12 individual PCAs 104 in a "12-up" configuration, PCB panel 200 may be configured to support any suitable number of printed circuits. Web or tree material of PCB panel 200 supports or connects PCAs 104 during various stages of PCA assembly (e.g., PCB material discarded when the PCAs 104 are removed from PCB panel 200). This web or tree material may include traces, which enable connectivity between PCAs 104 prior to singulation from PCB panel 200. Alternately or additionally, the web or tree portions of PCB panel 200 are structurally compromised to allow each PCA 104 to be separated from PCB panel 200 by flexure or an applied force such as shearing or pressing. In this particular example, holes 202 have been machined around each PCA 104 forming "mouse bites," which permit separation from PCB panel 200. Any suitable process may be used to compromise a region of PCB panel 200, such as drilling, routing, scoring, chamfering, filleting, and so on.

PCB panel 200 includes programming connector 204 configured to receive data and/or power from a programming host via programming media 106. PCB panel 200 may support a number of power and/or signal planes (not shown), which distribute power and allow communication among PCAs 104. PCAs 104 can communicate data when panelized as PCB panel 200 through electrical traces 206, which traverse compromised regions of PCB panel 200. In this particular example, electrical traces 206 serpentine through each PCA 104 effectively forming a communication chain for programming or testing. Separation of one or more PCAs 104 from PCB panel 200 can break or disrupt the communication chain. As illustrated in this example, electrical traces 206 may terminate at programmer connector 210 for connection to a downstream programming medium 210. For example, several PCB panels 200 may be connected in series, allowing a single programming host 102 to communicate with PCAs 104 of each panel. In other cases, electrical traces 206 may terminate at the last PCA 104 of the communication chain.

Each PCA 104 may transmit or receive data to other PCAs 104 or a programming host via electrical traces 206. Here, PCA 104 configured as an application specific integrated circuit (ASIC) 212 and NVM 128 can communicate using USB host interface 130 and/or USB device interface 132. Parameters of electrical traces 206 may be configured based on a communication interface, such as quantity and impedance. For example, a pair of electrical traces may have 90 ohm differential impedance and 30 ohm impedance to ground for USB communication. Alternately or additionally, PCB panel 200 may include additional electrical traces (not shown) that connect to PCAs 104 through the structurally compromised region for PCA configuration and setting purposes. For example, these electrical traces may pull-down or pull-up GPIOs of individual PCAs 104 for boot strapping or addressing.

Figure 3:
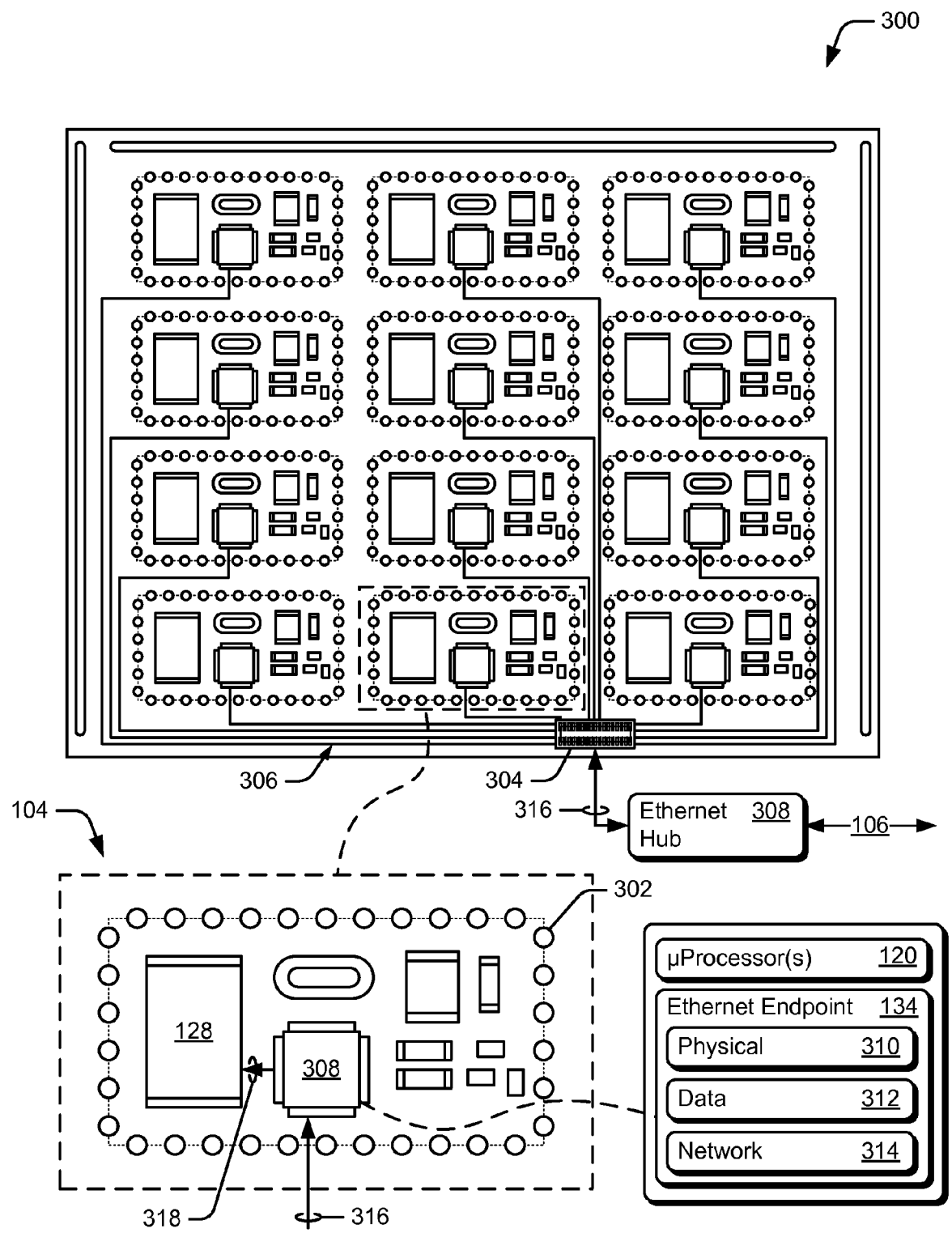
FIG. 3 illustrates another example of printed circuit assemblies of FIG. 1 panelized in accordance with one or more aspects.

FIG. 3 illustrates another example of an array of PCAs 104 of FIG. 1 panelized as printed circuit board (PCB) panel 300. Although shown as supporting 12 individual PCAs 104 in a "12-up" configuration, PCB panel 300 may be configured to support any suitable number of printed circuits. Web or tree material of PCB panel 200 supports or connects PCAs 104 during various stages of PCA assembly (e.g., PCB material discarded when the PCAs 104 are removed from PCB panel 200). This web or tree material may include traces, which enable connectivity between PCAs 104 prior to singulation from PCB panel 200. Alternately or additionally, the web or tree portions of PCB panel 300 are structurally compromised to allow or facilitate each PCA 104 to be separated from PCB panel 300 by flexure or shearing. In this particular example, holes 302 have been machined around each PCA 104 forming "mouse bites," which permit separation from PCB panel 300. Any suitable process may be used to compromise a region of PCB panel 300, such as drilling, routing, scoring, chamfering, filleting, and so on.

PCB panel 300 includes programming connector 304 configured to receive data and/or power from a programming host via programming media 106. PCB panel 300 may support a number of power and/or signal planes (not shown) which distribute power and allow communication with PCAs 104.

PCAs 104 can communicate data when panelized as PCB panel 300 through electrical traces 306, which traverse compromised regions of PCB panel 300. In this particular example, electrical traces 306 connect each PCA 104 to programming connector 304 for programming or testing. Separation of one or more PCAs 104 from PCB panel 300 would not disrupt or interfere with the communication link. As illustrated in this example, programming medium 106 connects to programming connector 304 via an Ethernet hub 308, which enables multipoint communication with a single programming host 102.

Each PCA 104 may transmit or receive data to a programming host via electrical traces 306. Here, PCA 104 configured as an application specific integrated circuit (ASIC) 308 and NVM 128 can communicate using Ethernet endpoint 134, which is configured for low level Ethernet connectivity. Here, Ethernet endpoint 134 features the first three levels of a network stack including physical layer 310 (physical 310), data layer 312 (data 312), and network layer 314 (network 314). Implementing a reduced network stack can conserve valuable space in memory or boot ROM of a PCA 104. Parameters of electrical traces 306 may be configured based on a communication interface, such as quantity and impedance. For example, two or four pairs of electrical traces may have 100 ohm differential impedance Ethernet communication.

Alternately or additionally, PCB panel 300 may include additional electrical traces (not shown), which connect to PCAs 104 through the structurally compromised region for PCA configuration and setting purposes. These additional electrical traces may pull-down or pull-up GPIOs of individual PCAs 104 for boot strapping or addressing. For example, electrical traces connected to GPIOs of PCA 104 may encode a binary panel position, which may form a unique media access control (MAC) address when combined with a fixed heading. Alternately or additionally, each PCA may generate a MAC address based on a unique identification of a component or on a combination of test pins contacting PCB panel 300.

Additional electrical traces of PCB panel 300 or PCAs 104 may also connect with test points for communicating data out-of-band from electrical traces 306. For example, boot ROM may be loaded to the PCAs 104 through pins of a test fixture contacting these test points. The test fixture may include a local boot ROM for loading, such as a serial peripheral interface (SPI) memory containing a full network stack. This boot ROM may then be executed by µprocessor 120 to enable communication via electrical traces 306.

Although illustrated with respect to panelized form, the configurations above may also be implemented once PCAs 104 have been singulated or "broken out" from a PCB panel. Any of the connections described above can by realized with use of a single level tray and a bed-of-nails test fixture, where the electrical traces are implemented within the test fixture, tray, or a combination thereof.

Techniques of Scalable Embedded Memory Programming

The following discussion describes techniques of scalable embedded memory programming. These techniques can be implemented using the previously described environments, such as programmer 112 of FIG. 1 embodied on a programming host 102 and/or data relay 124 of FIG. 1 embodied on a PCA 104. These techniques include methods illustrated in FIGS. 4, 5, and 6, each of which is shown as a set of operations performed by one or more entities. These methods are not necessarily limited to the orders shown for performing the operations. Further, these methods may be used in conjunction with one another, whether performed by the same entity, separate entities, or any combination thereof. In portions of the following discussion, reference will be made to operating environment 100 of FIG. 1 and entities of FIGS. 2 and 3 by way of example. Such reference is not to be taken as limited to operating environment 100 but rather as illustrative of one of a variety of examples.

Figure 4:
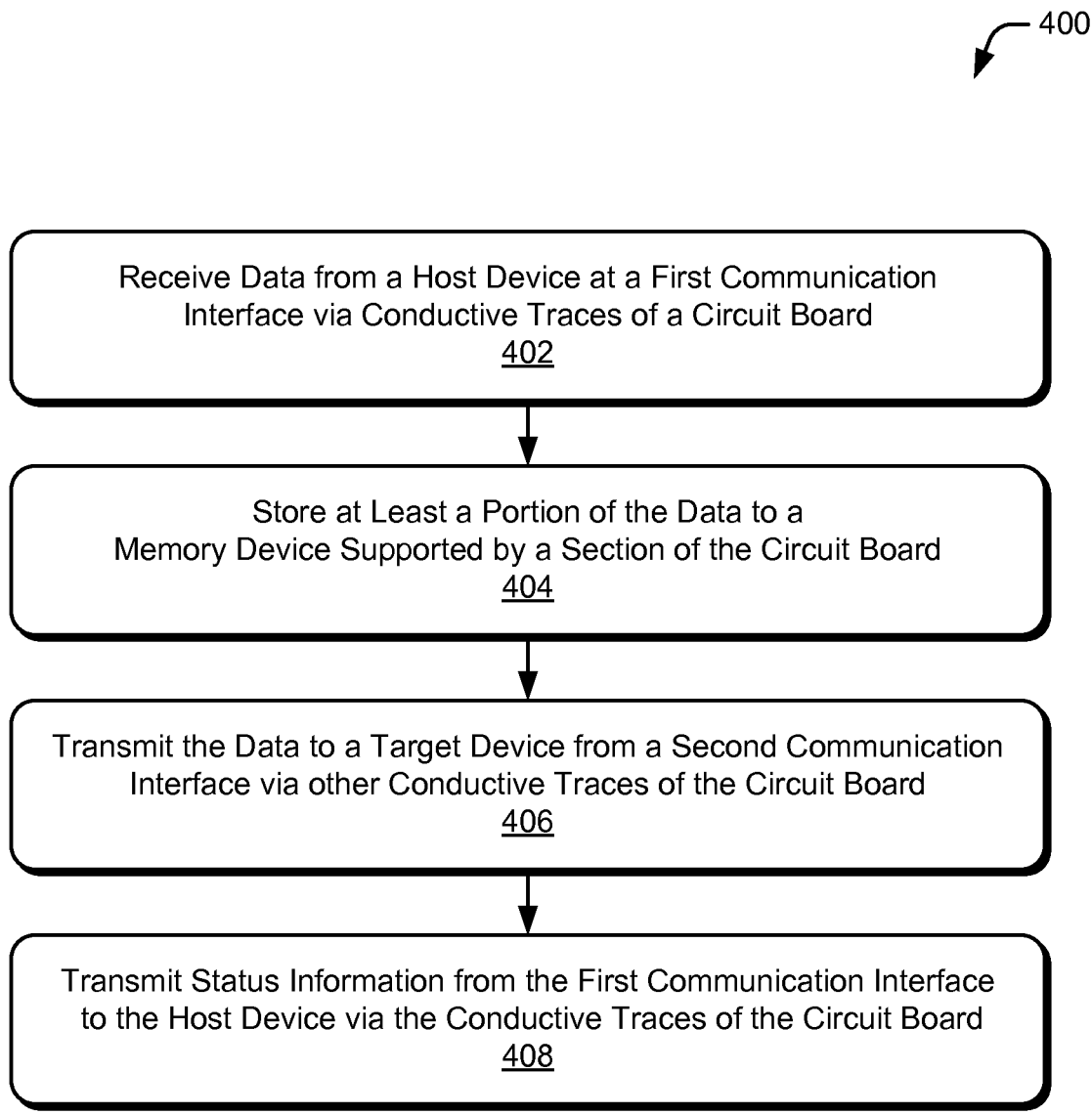
FIG. 4 illustrates a method of programming a downstream target device with data received from an upstream interface.

FIG. 4 depicts a method 400 for programming a downstream target assembly with code received from an upstream interface, including operations performed by data relay 124 of FIG. 1.

At 402, data from a host device is received at a first communication interface via conductive traces of a circuit board. These conductive traces may pass through a structurally compromised region of the circuit board, such as the "webbing" created when printed circuit assemblies are processed to be singulated from the circuit board. The host device may be a master programming host or a PCA upstream of the first communication port. The first communication interface may be of any suitable type, such as a USB port, an Ethernet port, SPI bus port, and so on. Alternately or additionally, the communication interface may be configured to receive the data by a GPIO or register bit (e.g., Latch-on-Reset (LoR) bit) set by a text fixture in which the circuit board resides.

The data received from the host device may contain code for programming or re-programming a memory component of a PCA. Alternately or additionally, the data may contain addressing information for status and control functions of an individual PCA. For example, a PCA receiving the data may generate an address by incrementing an address within the data, thereby creating an address that is unique from an upstream PCA or host device.

As an example, consider an individual PCA 104 in the context of FIG. 2, which shows PCA 104 located within PCB panel 200 along with other PCAs 104. Here, USB device interface 132 of ASIC 212 is connected to a USB host interface 130 of an upstream PCA 104. USB host interface 130 of ASIC 212 is also connected to a USB device interface 132 of a downstream PCA 104. Assume here that ASIC 212 receives data 214 including binary address information and a memory image at USB device interface 132 from the upstream PCA 104. Here, data relay 124 increments the binary address information to generate a unique address for PCA 104.

At 404, at least a portion of the data is stored to a memory device supported by a section of circuit board. The section of the circuit board may include components of a PCA including processing, communication, power, and/or additional memory components. The section of the circuit board is bounded on one or more sides by a structurally compromised region of the circuit board enabling the section of the circuit board to be separated from the remaining circuit board. The portion of the data may be a memory image that is stored to the memory device by programming or flashing. In some cases, the memory image may be buffered in a volatile memory device (e.g., DRAM) prior to being stored in a non-volatile memory device (e.g. NAND Flash).

In the context of the present example, data relay 124 stores the memory image 216 received from the upstream PCA 104 in NVM 128 of PCA 104. Assume here that memory image 216 is stored in DRAM (not shown) of ASIC 212 prior to storing the memory image to NVM 128. Storing data in DRAM can reduce data access times for verification and/or copying purposes of memory image 216.

At 406, the data is transmitted to a target device from a second communication interface via other conductive traces of the circuit board. These conductive traces may pass through the structurally compromised region of the circuit board as described above. The target device may be another PCA downstream of the second communication port. The communication second interface may be of the same type as the first communication interface or any other suitable type as described herein.

The data transmitted to the target device may be modified prior to transmission. As described above, the data may contain a memory image and or addressing information. In some cases, the addressing information may be modified to include the incrementation associated with generating an address. This modified addressing information may enable the target device and other downstream devices to generate unique addresses.

Continuing the ongoing example, data relay 124 transmits data 218 that includes the incremented address information and memory image 216 from USB host interface 130 to the next PCA 104 downstream. Assume here that data relay 124 forwards data 218 from DRAM of ASIC 212, which allows memory image 216 to be transmitted before being completely stored to NVM 128. This permits memory image 216 and associated data to be forwarded through the chain of PCAs 104 more quickly than if the memory image 216 was copied to and from the NVM 128 of each PCA 104 individually.

Optionally, at 408 status information is transmitted from the first communication interface to the host device via the conductive traces of the circuit board. This status information may include unique address information and/or indicate progress of storing or forwarding data to a downstream target device. For example, status information may indicate that the data received is stored in local non-volatile memory and that the data has been successfully transmitted to a downstream target device. The unique address information may permit a host to determine when a cascaded series of target devices has been programmed or flashed with a memory image or other data.

Concluding the present example, data relay 124 transmits status information including the unique address of PCA 104 to the upstream PCA 104. Assume here, that this status information indicates that memory image 216 has been stored to NVM 128 and that data 218 has been transmitted to the downstream PCA 104. This status information can be relayed through the chain of PCAs 104 of PCB panel 200 enabling programming host 102 to monitor the status and/or progress of each PCA 104.

Figure 5:
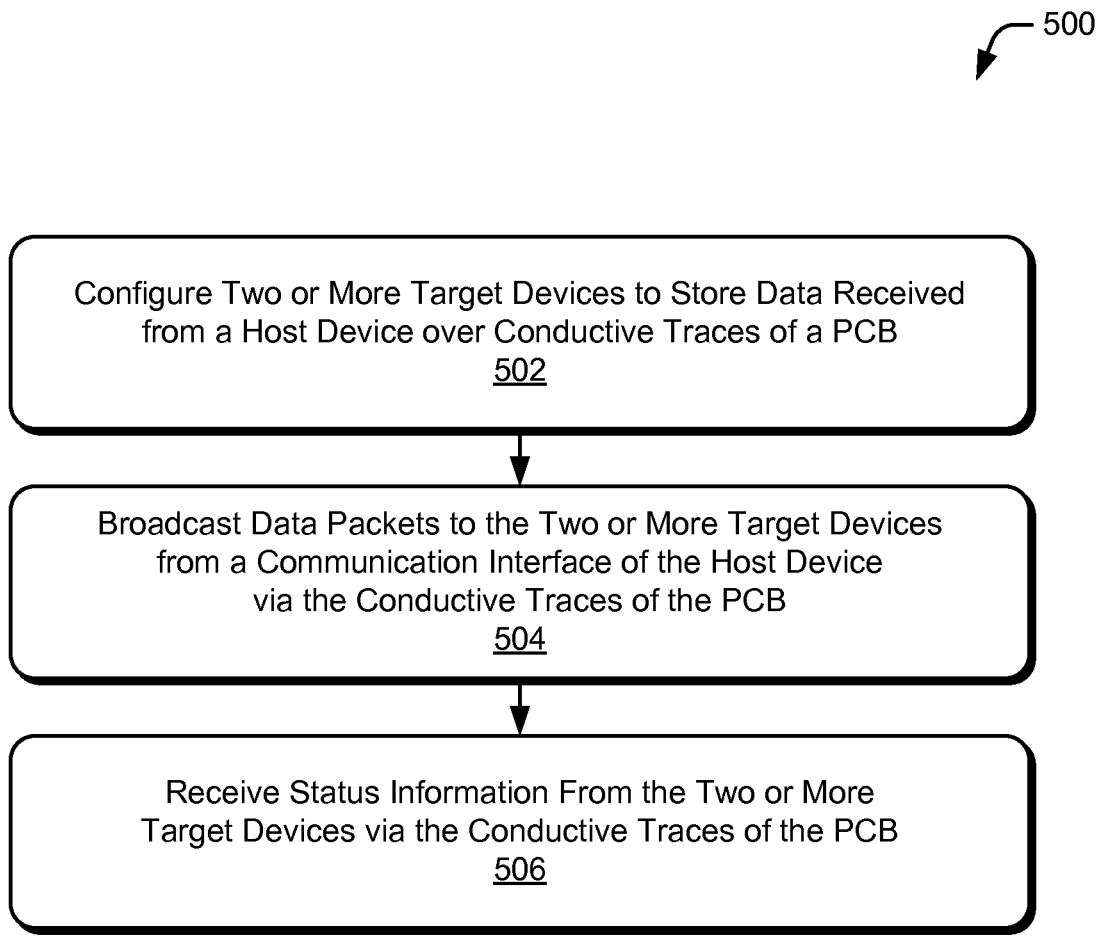
FIG. 5 illustrates a method of programming multiple target devices via a multiplexed connection.

FIG. 5 depicts a method 500 for programming multiple target assemblies via a multiplexed connection, including operations performed by data relay 124 of FIG. 1.

At 502, two or more target devices are configured to store data received from a host device over conductive traces of a PCB. These conductive traces may pass through a structurally compromised region of the PCB, such as the "webbing" created when printed circuit assemblies are processed to be singulated from the PCB. The host device may be a master programming host, such as programming host 102 or another embedded device. Data received from the host device may pass through a multiplexing device that allows a single host device to communicate with multiple target devices, such as a hub or switch. Communication with the host device may be compliant with any suitable protocol or standard, such as a USB, Ethernet, SPI, and so on.

The target devices may be configured to store the data received from the host device using any suitable means. In some cases, configuration to store the data is responsive to the target devices contacting pins of a testing or programming fixture. In other cases, applying power to target devices may cause the target devices to wait for a predetermined amount of time (e.g., 5-10 seconds) to receive data from a host device 102. Alternately or additionally, the target devices may be configured by a GPIO or register bit (e.g., Latch-on-Reset (LoR) bit) set by a test fixture contact or by an additional conductor of a PCB panel in which the target devices reside.

As an example, consider an individual PCA 104 in the context of FIG. 3, which shows PCA 104 located within PCB panel 300 along with other PCAs 104. Assume here, that boot ROM 126 of ASIC 308 is configured to check a register associated with a GPIO to determine if data from programming host 102 is expected. Also assume that additional conductive traces within PCB panel 300 connected to this GPIO indicate attachment with programming host 102 by pulling the GPIO low. Data relay 124 configures Ethernet endpoint 134 for communication with programming host 102 responsive the status of the register and prepares to store data received via Ethernet endpoint 134.

At 504, data packets are broadcast from a communication interface of the host device to the two or more target devices via the conductive traces of the PCB. Once received, the broadcast data packets can be stored by the two or more target devices. The data packets transmitted by the host device may pass through a multiplexing device that allows a single host device to communicate with multiple target devices, such as a hub or switch. For example, an Ethernet switch may allow a single programming host to transmit data to any suitable number of target devices.

In the context of the present example, programmer 112 transmits data 316 from Ethernet port 118 of programming host 102 to Ethernet hub 308 via programming medium 106. Assume here, that the data includes memory image 318 for NVM 128 of PCA 104. ASIC 308 of PCA 104 receives data 316 via Ethernet endpoint 134 and stores data 316 to internal DRAM (not shown). Data relay 124 may then program memory image 318 from DRAM of ASIC 308 to NVM 128, which may overwrite any existing code within NVM 128. By enabling multiple target devices to contemporaneously store data broadcast by a single host, time typically consumed when programming multiple target devices individually can be greatly reduced.

Optionally at 506, status information is received from the two or more target devices. The status information of each of the two or more target devices may be differentiated by address information associated with the status information, such as a MAC address. In some cases, each of the two or more target devices may have a unique MAC address generated from unique information of a component of the target device. In other cases, the MAC address may be based on GPIO inputs of each target device that are configured by additional conductive traces within a PCB panel or contacts of a programming fixture. Alternately or additionally, control and command information may be sent to individual target device based on unique address information.

Concluding the present example, status information is transmitted by respective data relays 124 of each of the PCAs 104 upon completion of storing memory image 318. Assume here, that the status information includes MAC address information useful to communicate with each PCA 104. Programming host 102 may then use this address information to query or test each PCA 104 of PCB panel 300 on an individual basis.

Figure 6:
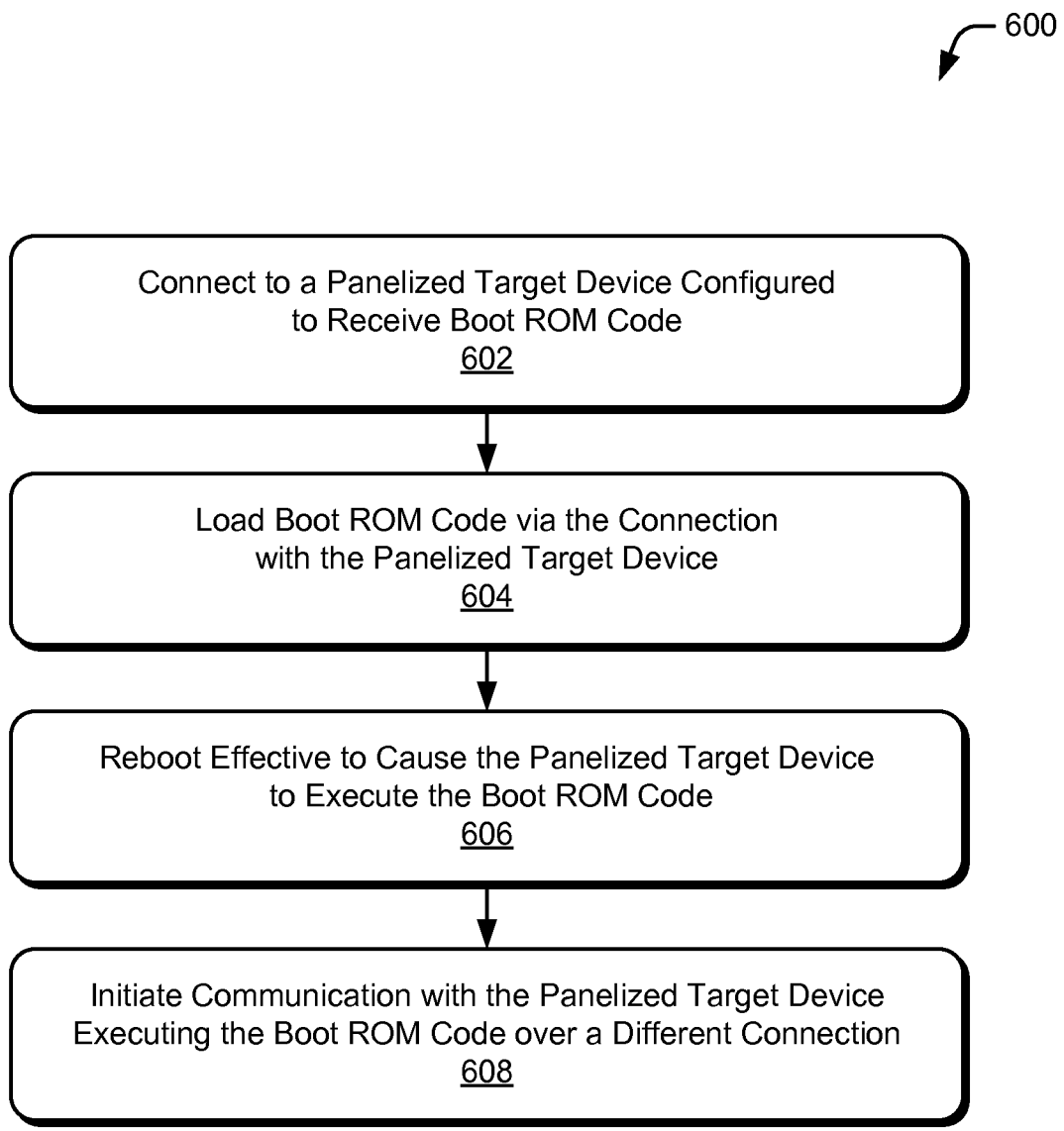
FIG. 6 illustrates a method of providing code to a panelized target device to enable programming.

FIG. 6 depicts a method 600 for providing code to a target device to enable programming.

At 602, a connection is established with a panelized target device configured to receive boot ROM code. By way of example, the target device may be panelized as described above with reference to FIGS. 2 and 3. In some cases, the target device may be configured to receive boot ROM code responsive to a register or latch setting. In such a case, a donor SPI component may be located external to the target device, such as on a test or programming fixture. The target device may also wait a predetermined amount of time to receive boot ROM code. The connection with the panelized target device may be any suitable connection, such as a boot SPI interface.

At 604, boot ROM code is loaded via the connection with the panelized target device. The boot ROM code can be loaded by any suitable programming device or host. In some cases, the boot ROM code is loaded from a donor SPI memory component external to the target device, such as a SPI component located on a programming or test fixture.

At 606, the panelized target device is rebooted effective to cause the target device to execute the boot ROM code. The target device can be reset in any suitable fashion, such as power-cycling an entire PCB panel of which the target device is part of. In other cases, the target device may reset responsive to completion of loading the boot ROM code. Once the target device begins executing the loaded Boot ROM code, previously disabled or non-functioning capabilities of the target device may be enabled. For example, a communication interface can be enabled by executing the ROM code (e.g., an Ethernet or wireless connection), enabling additional code (e.g., code of an operating system) to be loaded on the panelized target device.

Optionally, at 608, communication is initiated with the panelized target device executing the loaded boot ROM code over a different connection. The different connection may be any suitable connection, such as a USB connection or an Ethernet connection as described herein. Once connection over the different interface is initiated, a host device may perform other programming or diagnostic activities. In some cases, the different connection has a higher bandwidth than the connection used to load the boot ROM code. In such a case, using the higher bandwidth connection can reduce an amount of time needed to run diagnostics or other memory components.

System-on-Chip

Figure 7:
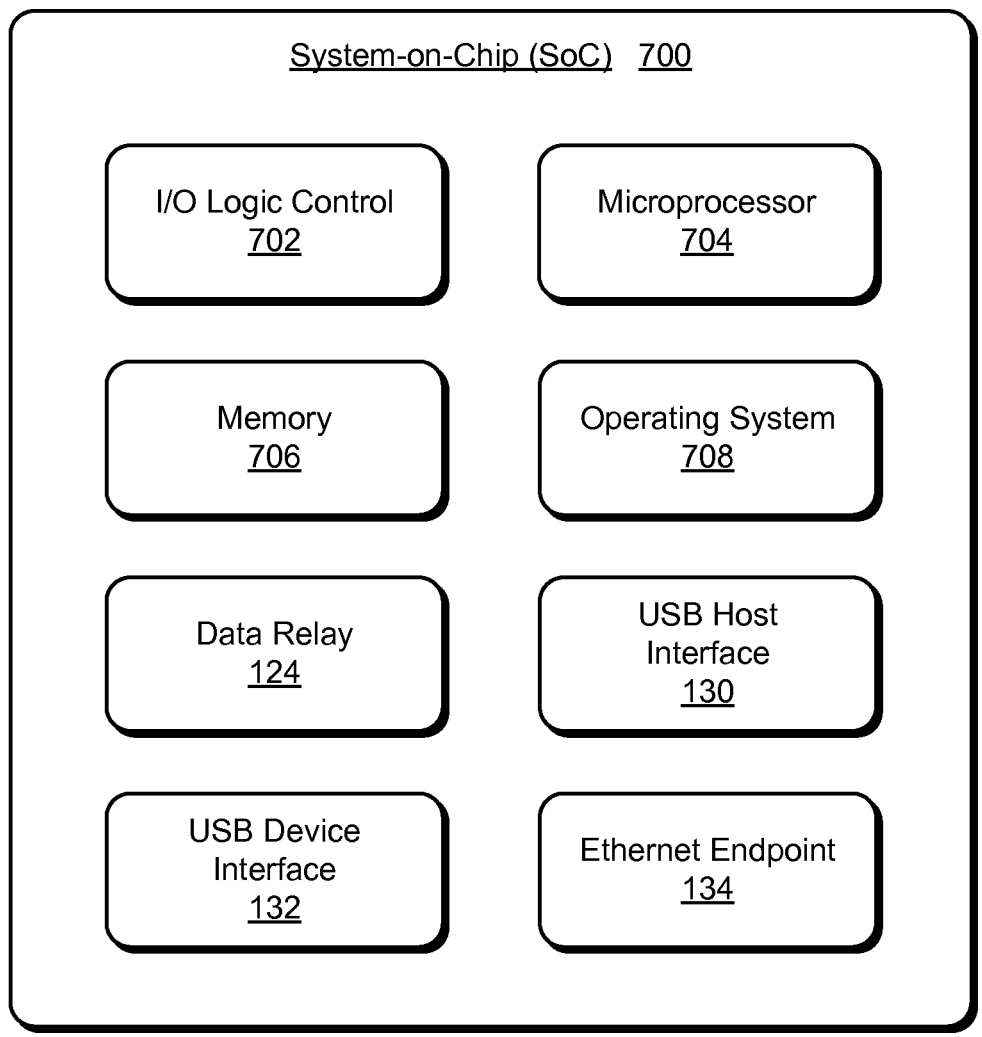
FIG. 7 illustrates a System-on-Chip (SoC) environment for implementing aspects of the techniques described herein.

FIG. 7 illustrates a System-on-Chip (SoC) 700, which can implement various embodiments described above. A SoC can be implemented in any suitable device, such as a video game console, IP enabled television, desktop computer, laptop computer, tablet computer, server, network-enabled printer, set-top box, printer, scanner, camera, picture frame, and/or any other type of device that may implement wireless connective technology.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus (not shown) that couples the various components of the SoC for data communication between the components. A wireless communication device that includes SoC 700 can also be implemented with many combinations of differing components. In some cases, these differing components may be configured to implement concepts described herein over a wireless connection or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes data relay 124, USB host interface 130, USB device interface 132, and Ethernet endpoint 134 (embodied as disparate or combined components as noted above). Examples of these various components, functions, and/or entities, and their corresponding functionality, are described with reference to the respective components of the environment 100 shown in FIG. 1 and FIG. 2.

Data relay 124, either independently or in combination with other entities, can be implemented as computer-executable instructions maintained by memory 706 and executed by microprocessor 704 to implement various embodiments and/or features described herein. Data relay 124 may also be provided integral with other entities of the SoC, such as integrated with one or both of I/O logic controller 702 or any packet-based interface within SoC 700. Alternatively or additionally, data relay 124 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A System-on-Chip (SoC) comprising:
a first communication interface configured to communicate with a programming host;
a second communication interface configured to communicate with a programmable target device via conductive traces that traverse a structurally compromised region of a printed circuit board (PCB), the structurally compromised region of the PCB forming at least one edge of a section of the PCB that supports the SoC, the section of the PCB that supports the SoC being physically separable from the PCB;
a memory configured to store data associated with the SoC; and
a data relay configured to:
receive, via the first communication interface, data from the programming host;
store at least a portion of the data received from the programming host in the memory; and
transmit, via the second communication interface, at least the portion of the data to the programmable target device.

2. The System-on-Chip of claim 1, wherein the structurally compromised region is drilled, routed, scored, chamfered, filleted, or machined such that the section of the PCB that supports the SoC is separable from the PCB by an applied force.

3. The System-on-Chip of claim 1, wherein the programming host is another programmable target device co-located with the SoC on the PCB.

4. The System-on-Chip of claim 1, wherein the first communication interface is a universal serial bus (USB) device interface and the second interface is a USB host interface.

5. The System-on-Chip of claim 1, wherein the programmable target device comprises a printed circuit assembly including another SoC and is physically separable from the PCB.

6. The System-on-Chip of claim 1, wherein the memory is volatile memory, and the data relay is further configured to cause at least the portion of data to be written from the volatile memory to a non-volatile memory operably coupled with the SoC.

7. The System-on-Chip of claim 1, wherein the at least the portion of the data includes a memory image for the non-volatile memory operably coupled with the SoC.

8. The System-on-Chip of claim 1, wherein the data relay is further configured to:
receive, from the programming host, address information associated with the programming host; and
generate, based on the address information, other address information that is unique to the SoC and useful to communicate status information of the SoC to the programming host.

9. The System-on-Chip of claim 8, wherein the data relay is further configured to transmit, to the programmable target device, the other address information unique to the SoC effective to enable the programmable target device to generate different address information that is unique to the programmable target device.

10. The System-on-Chip of claim 1, wherein conductors of the PCB are configured such that physically separating the programmable target device from the PCB severs a communicative link of the second interface of the SoC with the programmable target device.

11. A System-on-Chip (SoC) comprising:
a communication interface configured to communicate with a programming host via conductive traces that traverse a structurally compromised region of a printed circuit board (PCB), the structurally compromised region of the PCB forming at least one edge of a section of the PCB that supports the SoC, the section of the PCB that supports the SoC being physically separable from the PCB;
a memory configured to store data associated with the SoC; and
a data relay configured to:
receive, via the communication interface, data from the programming host;
store at least a portion of the data received from the programming host in the memory; and
transmit, via the communication interface, information to the programming host that indicates a status associated with storing the portion of the data in the memory.

12. The System-on-Chip of claim 11, wherein the structurally compromised region is drilled, routed, scored, chamfered, filleted, or machined such that the section of the PCB that supports the SoC is separable from the PCB by an applied force.

13. The System-on-Chip of claim 11, wherein the communication interface of the SoC communicates in accordance with an IEEE 802.3 communication standard.

14. The System-on-Chip of claim 13, wherein the data relay is further configured to transmit the information to the programming host using a medium access control (MAC) address of the communication interface.

15. The System-on-Chip of claim 13, wherein the data received from the programming host is received via an Ethernet switch or Ethernet hub operably associated with the programming host.

16. A System-on-Chip (SoC) comprising:
a first communication interface configured to receive boot code;
a second communication interface configured to communicate with a programming host via conductive traces that traverse a structurally compromised region of a printed circuit board (PCB), the structurally compromised region of the PCB forming at least one edge of a section of the PCB that supports the SoC, the section of the PCB that supports the SoC being physically separable from the PCB;
a memory configured to store the boot code associated with the SoC; and
a data relay configured to:
receive, via the first communication interface, the boot code from a boot code device that is not located on the PCB;
store the boot code received from the boot code device in the memory;
cause the SoC to reboot effective to execute the boot code stored in the memory, the second communication interface enabled by the execution of the boot code; and
receive, via the second communication interface once the second communication interface is enabled, additional boot code or data from the programming host that is executable to implement functionalities of the SoC.

17. The System-on-Chip of claim 16, wherein the structurally compromised region is drilled, routed, scored, chamfered, filleted, or machined such that the section of the PCB that supports the SoC is separable from the PCB by an applied force.

18. The System-on-Chip of claim 16, wherein the first communication interface is a serial peripheral interface (SPI) and the second communication interface is a universal serial bus (USB) interface or an Ethernet interface.

19. The System-on-Chip of claim 16, wherein the first communication interface has less communicative bandwidth than the second communication interface.

20. The System-on-Chip of claim 16, wherein the first communication interface communicates with the boot code device via test pins in contact with other conductive traces of the PCB.

* * * * *